United States Patent
Yano et al.

(10) Patent No.: US 7,046,233 B2
(45) Date of Patent: May 16, 2006

(54) ELECTRONIC APPARATUS

(75) Inventors: Kazuyoshi Yano, Tokyo (JP);
Masafumi Tamura, Kanagawa (JP);
Taeko Kuwano, Tokyo (JP)

(73) Assignee: Sony Corporation, Tokyo (JP)

( * ) Notice: Subject to any disclaimer, the term of this patent is extended or adjusted under 35 U.S.C. 154(b) by 341 days.

(21) Appl. No.: 10/106,478

(22) Filed: Mar. 25, 2002

(65) Prior Publication Data

US 2002/0167883 A1 Nov. 14, 2002

(30) Foreign Application Priority Data

Mar. 27, 2001 (JP) ............................. 2001-091271

(51) Int. Cl.
*G09G 5/00* (2006.01)
(52) U.S. Cl. ..................... 345/160; 345/161; 345/156; 345/164; 345/184
(58) Field of Classification Search ................ 345/160, 345/161, 857, 856, 156, 164, 184
See application file for complete search history.

(56) References Cited

U.S. PATENT DOCUMENTS 5,568,164 A * 10/1996 Ogawa ........................ 345/856
5,600,580 A * 2/1997 Honjo et al. ................. 361/681
5,900,848 A * 5/1999 Haneda et al. ................ 345/1.1
6,275,376 B1 * 8/2001 Moon .......................... 361/683
6,504,706 B1 * 1/2003 Stewart ....................... 361/681
6,754,069 B1 * 6/2004 Harada ........................ 361/681

* cited by examiner

*Primary Examiner*—Michael Razavi
*Assistant Examiner*—Daniel Chung
(74) *Attorney, Agent, or Firm*—Frommer Lawrence & Haug LLP; William S. Frommer; Samuel S. Lee

(57) ABSTRACT

An electronic apparatus includes an apparatus body, a lid member, a supporting mechanism, an operation section and a control section. The apparatus body has a playback section. The lid member has a display section provided on one face thereof. A signal from the playback section is supplied to the display section. The supporting mechanism is provided between the apparatus body and the lid member. The supporting mechanism supports the lid member on the apparatus body for pivotal motion between a first position wherein the lid member covers an upper face of the apparatus body and a second position wherein the lid member uncovers the upper face of the apparatus body and also for pivotal motion around an axis parallel to the plane of the lid member at the second position. The operation section is provided on the apparatus body. The control section is provided on the apparatus body. The control section changes over a direction of movement of a cursor displayed on the display section based on an input signal from the operation section in response to a state of the lid member pivoted around the axis parallel to the plane of the lid member at the second position.

26 Claims, 12 Drawing Sheets

ELECTRONIC APPARATUS

BACKGROUND OF THE INVENTION

This invention relates to an electronic apparatus, and more particularly to an electronic apparatus wherein a display section for displaying information is provided for pivotal motion with respect to an apparatus body.

A disk player is known which plays back information of a video, music and so forth recorded on an optical disk such as, for example, a CD (Compact Disc) or a DVD (Digital Versatile Disc) As a disk player of the type mentioned, a portable disk player is available which includes a display section for displaying information played back from an optical disk.

A conventional portable disk player includes an apparatus body provided with a playback function, which is hereinafter described, for playing back information from an optical disk such as, for example, a DVD and other necessary functions, and a lid member having a display section on which information read out and played back from an optical disk is displayed.

The apparatus body includes a disc rotational driving mechanism for driving an optical disk to rotate, and a playback mechanism provided with an optical pickup for reading out information recorded on the optical disk. The disk rotational driving mechanism includes a disk table for receiving an optical disk placed thereon, and a spindle motor for driving the disk table to rotate.

An operation section for being operated by the user to move a cursor or the like displayed on the display section in an upward, downward, leftward or rightward direction on a display screen of the display section is provided at a corner portion of the front face side of a principal surface of the apparatus body. The operation section includes an operation button which is operated to be selectively pushed down at an outer peripheral portion thereof in four directions corresponding to the upward, downward, leftward and rightward directions of the display screen in order to move the cursor or the like in the upward, downward, leftward or rightward direction so that information of a desired playback object or the like may be selected from within a list for selection of information of a plurality of playback objects recorded on an optical disk and displayed as a selection menu on the display section. The operation section is covered at an upper face thereof with the lid member when the lid member closes the apparatus body.

The edge of the lid member is supported on the rear face side of the apparatus body for opening and closing movement with respect to the apparatus body by a pivotal supporting mechanism.

The display section for displaying information is provided on a face of the lid member which is opposed to the principal surface of the apparatus body when the lid member closes the apparatus body. The display section includes liquid crystal display device which is electrically connected to a circuit board installed in the apparatus body.

In the conventional portable disk player having the configuration described above, when information read out from an optical disk is to be played back, the lid member uncovers the apparatus body and the operation section provided on the main face of the apparatus body is exposed to the outside. If the user operates to push down an end portion or the like of the operation button in one direction, then information of a desired playback object and so forth is selected from within a list for selection of information of playback objects of a selection menu displayed on the display screen of the display section. In the disk player, an optical disk is driven to rotate by the disk rotational driving mechanism in response to an input signal from the operation section and the selected information is played back by the playback mechanism.

The disk player described above is configured such that the user can visually observe the display section if the lid member is pivotally operated until it stands uprightly with respect to the apparatus body. If a first user A intends to make it possible for a second user B to visually observe the display screen, then the user A must operate the entire disk player to turn to a position at which the user B can visually observe the display section. In this instance, if the user A tries to operate the operation section while the disk player is kept in the state wherein the user B can visually observe the display section, then the user A must operate the operation button in a direction different from the direction set originally to the operation button of the operation section. For example, such a problem occurs that, if the operation button is operated in one direction, then although the cursor or the like on the display screen must originally move in the upward, downward, leftward or rightward direction, the direction of the movement with regard to the leftward and rightward directions is reversed because the disk player is directed to the user B. Also such a problem occurs that servoing operation of the disk player is lost by vibrations or the like when the disk player is directed to the user B.

SUMMARY OF THE INVENTION

It is therefore an object of the invention to provide an electronic apparatus which resolves the above-mentioned problem.

In order to attain the object described above, according to an aspect of the present invention, there is provided an electronic apparatus, including an apparatus body having a playback section, a lid member having a display section provided on one face thereof, a signal from the playback section being supplied to the display section, a supporting mechanism provided between the apparatus body and the lid member for supporting the lid member on the apparatus body for pivotal motion between a first position wherein the lid member covers an upper face of the apparatus body and a second position wherein the lid member uncovers the upper face of the apparatus body and also for pivotal motion around an axis parallel to the plane of the lid member at the second position, an operation section provided on the apparatus body, and a control section provided on the apparatus body for receiving an input signal supplied thereto from the operation section, the control section changing over a direction of movement of a cursor displayed on the display section based on the input signal from the operation section in response to a state of the lid member pivoted around the axis parallel to the plane of the lid member at the second position.

According to another aspect of the present invention, there is provided an electronic apparatus, including an apparatus body having a playback section, a lid member having a display section provided on one face thereof, a signal from the playback section being supplied to the display section, a supporting mechanism provided between the apparatus body and the lid member for supporting the lid member on the apparatus body for pivotal motion between a first position wherein the lid member covers an upper face of the apparatus body and a second position wherein the lid member uncovers the upper face of the apparatus body and also for pivotal motion around an axis parallel to the plane of the lid member at the second position, a detection section provided for the apparatus body for detecting in which one of directions around an axis parallel to the plane of the lid member at the second position the lid member is pivoted, an operation section provided on the apparatus body, and a control section provided on the apparatus body for receiving a detection signal and an input signal supplied thereto from the detection section and the operation section, respectively, the control section changing over an operation based on the input signal from the operation section in response to the detection signal supplied thereto from the detection section.

According to a further aspect of the present invention, there is provided an electronic apparatus, including a lid member having a display section provided on one face thereof, an apparatus body having an electric circuit section for supplying a signal to the display section, the electric circuit section and the display section being electrically connected to each other, a pivotal supporting mechanism provided on the apparatus body and having a first pivotal axis and a second axis, the first pivotal axis extending substantially in parallel to a principal surface of the apparatus body, the lid member being pivotally moved around the first pivotal axis between a first position wherein the lid member covers an upper face of the apparatus body and a second position wherein the lid member uncovers the upper face of the apparatus body, the second pivotal axis extending in parallel to the plane of the lid member pivoted to the second position, the lid member being pivotally moved around the second axis, an operation section provided on the apparatus body, and a control section provided in the electric circuit section for receiving an input signal supplied thereto from the operation section, the control section changing over an operation based on the input signal from the operation section between a first state wherein the lid member is pivoted in one direction around the second pivotal axis and a second state wherein the lid member is pivoted in the other direction around the second pivotal axis.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

Electronic apparatuses according to the present invention are described below with reference to the accompanying drawings. In the preferred embodiments described below, the electronic apparatus is formed as a portable disk player which plays back information recorded on an optical disk.

Figure 1:
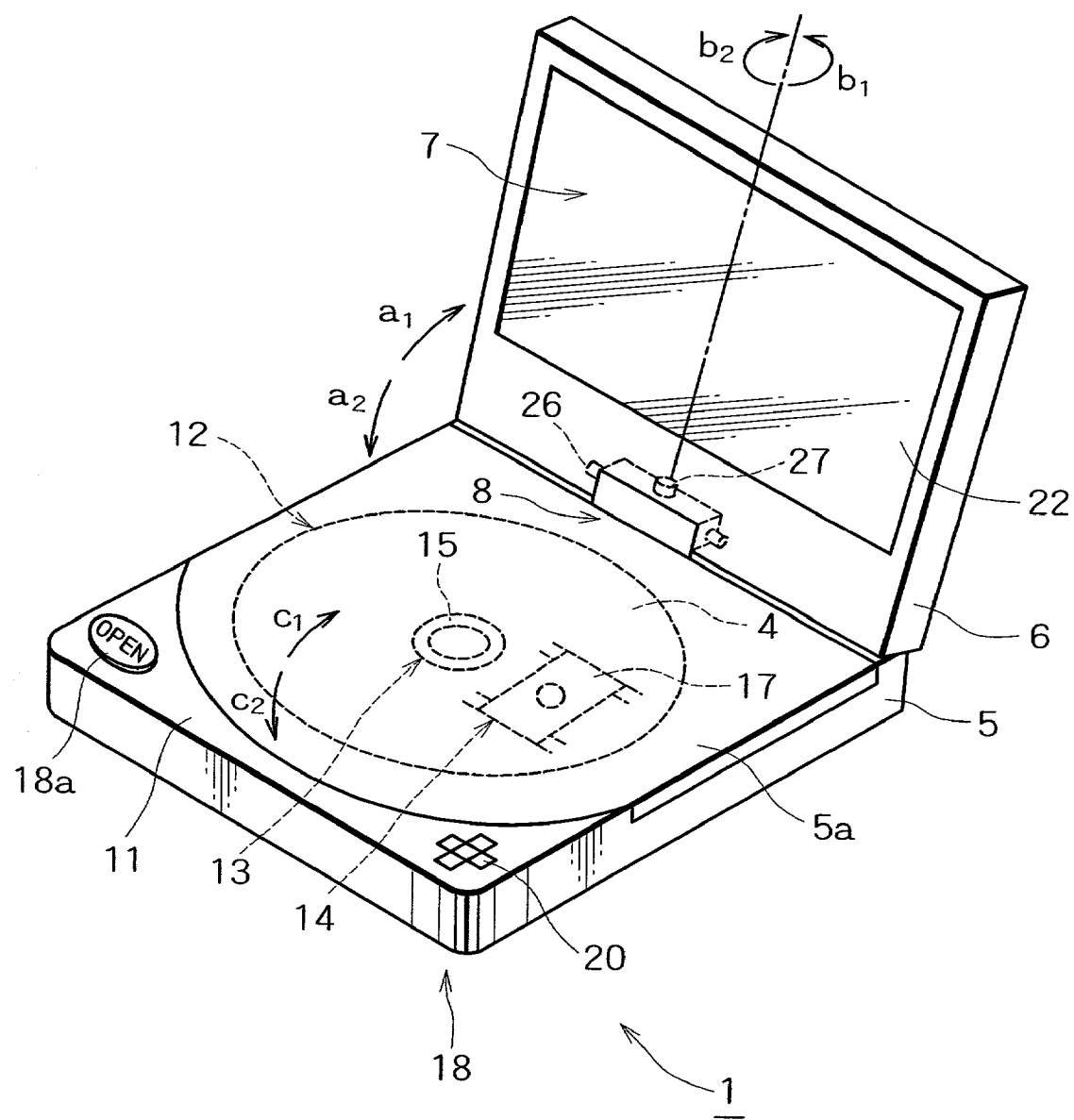
FIG. 1 is a perspective view showing a disk player according to the present invention.

Referring first to FIG. 1, the disk player 1 includes an apparatus body 5 for playing back information of a video, music and so forth from an optical disk 4 such as, for example, a DVD (Digital Versatile Disc), and a lid member 6 provided for opening and closing motion in the direction of an arrow mark $a_1$ and the direction of another arrow mark $a_2$ and also for pivotal motion in the direction of an arrow mark $b_1$ and the direction of another arrow mark $b_2$ on the apparatus body 5 and having a display section 7 for displaying played back information.

The apparatus body 5 is formed into a shape of a box or a rectangular parallelepiped, wherein a principal surface 11 is a little grater than the diameter of the optical disk 4 and substantially quadrangular shape . As seen in FIG. 1, a disk accommodating recess 12 onto which the optical disk 4 is to be mounted is provided on the principal surface 11 which is closed up with the display section 7. An accommodating lid 5a is mounted for pivotal opening and closing motion in the direction of an arrow mark $c_1$ and the direction of another arrow mark $c_2$ relative to the disk accommodating recess 12 on the apparatus body 5 by a hinge mechanism not shown. The accommodating lid 5a is pivoted in an opening direction, that is, in the direction of the arrow mark $c_1$ by operation of an opening button 18a which is a component of an operation section which is hereinafter described.

As seen in FIG. 1, a disk rotating driving mechanism 13 for driving the optical disk 4 to rotate and a playback mechanism 14 for playing back information from the optical disk 4 are provided in the disk accommodating recess 12 of the apparatus body 5. The disk rotating driving mechanism 13 includes a disk table 15 for receiving the optical disk 4 placed thereon, and a spindle motor 16 for driving the disk table 15 to rotate. The playback mechanism 14 includes an optical pickup 17 for playing back information from the optical disk 4, and a feed mechanism not shown for moving the optical pickup 17 in a diametrical direction of the optical disk 4.

Figure 2:
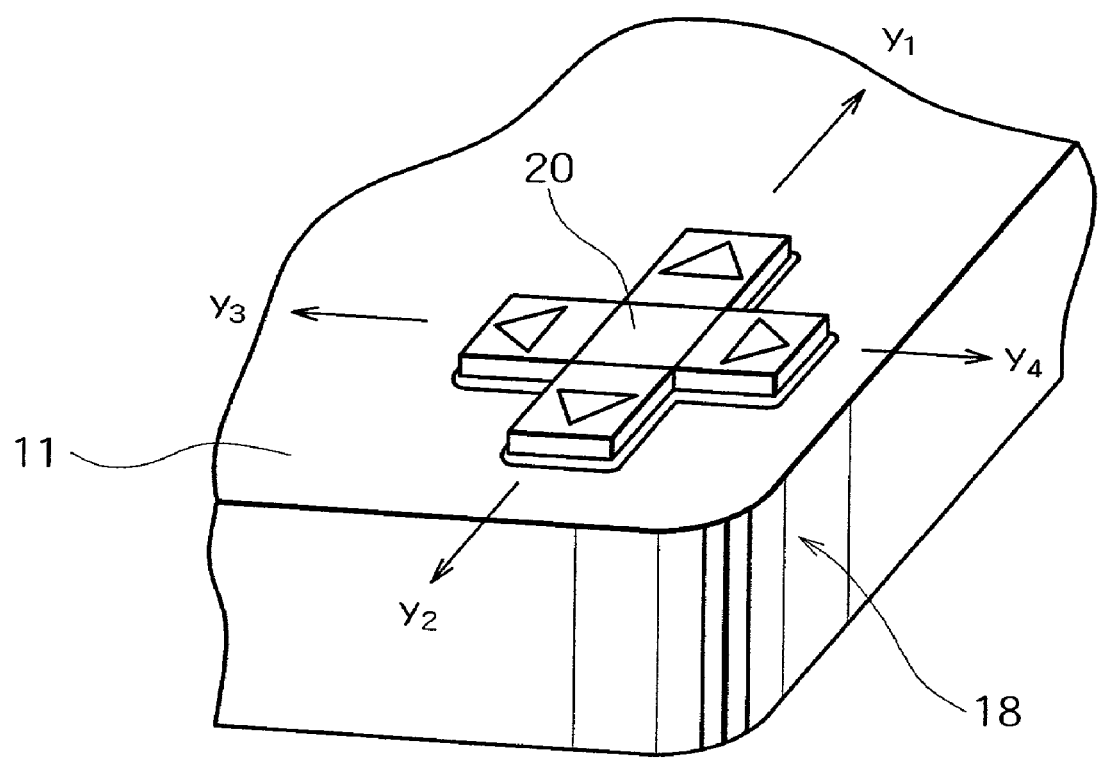
FIG. 2 is a perspective view showing an operation section of the disk player shown in FIG. 1.
Figure 3:
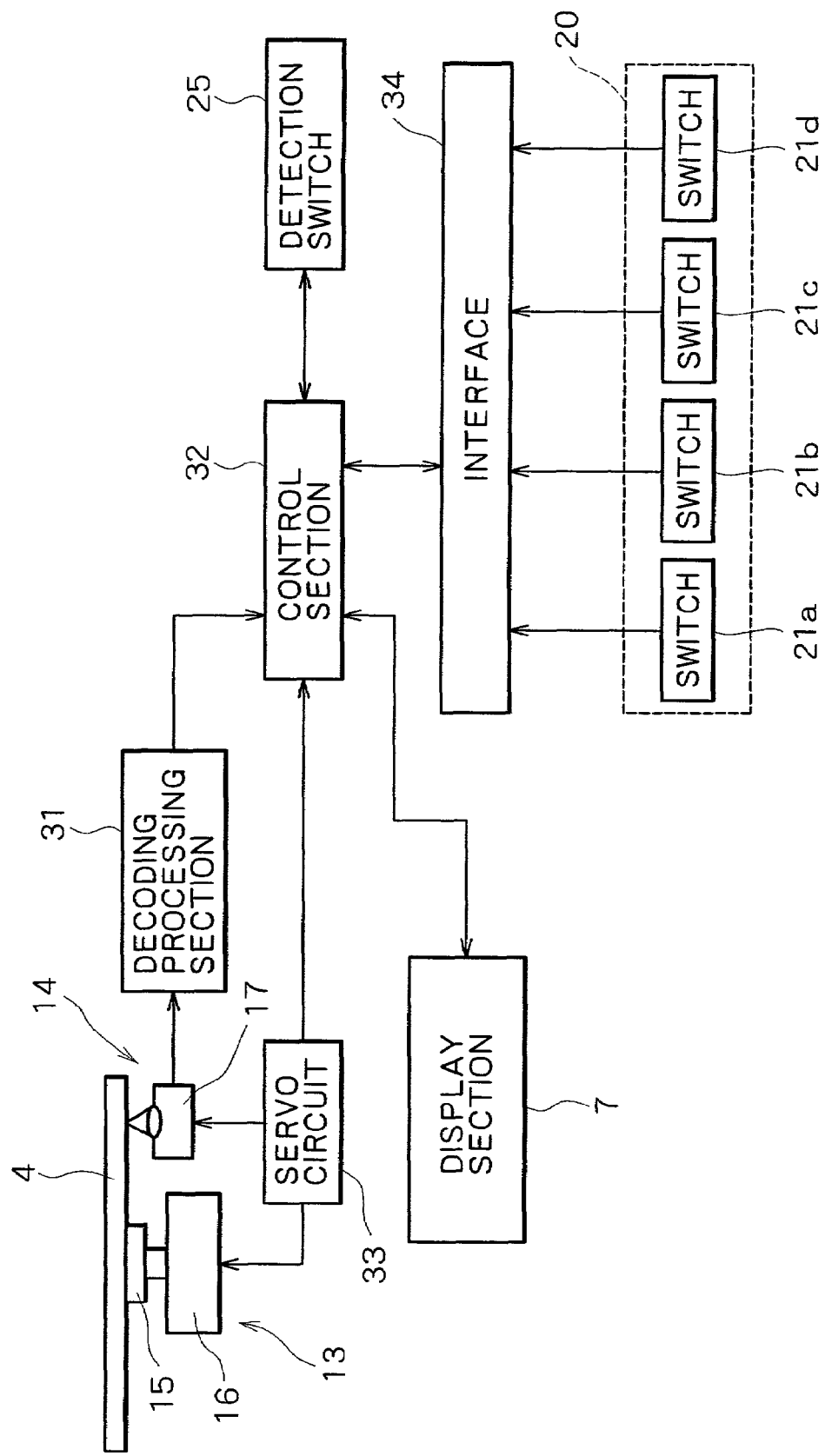
FIG. 3 is a block diagram of the disk player shown in FIG. 1.

An operation section 18 for operating the apparatus body 5 is disposed at a corner portion of the front end side of the principal surface 11 of the apparatus body 5 as shown in FIGS. 1 and 2. The operation section 18 includes an operation button 20 of a substantially cross shape for being operated in operation directions corresponding to the upward, downward, leftward and rightward directions on the display face of the display section 7, and an opening button 18a for moving the accommodating lid 5a to its opening position. The operation button 20 is disposed at one of the corners of the principal surface 11 of the apparatus body 5 for being operated to be pushed in at end portions thereof in the four directions on the apparatus body 5. The opening button 18a is disposed at the other corner portion of the principal surface 11. As shown in FIG. 3, switches 21a, 21b, 21c and 21d are provided at positions corresponding to the four end portions of the operation button 20 such that, when one of the end portions of the operation button 20 is operated to be pushed in, that is, pushed inwardly of the apparatus body 5, by the user, a corresponding one of the switches 21a, 21b, 21c and 21d is operated.

When the user wants to play back desired information from the optical disk 4, if the user operate to selectively push in one of the end portions for the different operation directions of the operation button 20, then the operation section 18 can move, for example, a cursor or the like in the upward, downward, leftward or rightward direction on the screen to selectively operate information recorded on the optical disk 4 from within a list of playback contents or the like displayed as a selection menu on the display face of the display section 7.

Though not shown in the drawings, external output terminals for outputting signals of a video, music and so forth to an external display apparatus such as, for example, a monitor display unit are provided on the apparatus body 5. If the external output terminals of the disk player 1 are connected to the external display apparatus when necessary, then it is possible, for example, to display a video displayed on the display section 7 in an enlarged scale on the external display apparatus.

The lid member 6 has a principal surface formed with a size substantially equal to the size of an outer profile of the principal surface 11 of the apparatus body 5, and the display section 7 is provided on a face of the lid member 6 confronting with the principal surface 11 of the apparatus body 5. The display section 7 has a liquid crystal display device 22 of, for example, the TFT (Thin Film Transistor) type, which is electrically connected to a circuit board on which electric parts which compose a circuit of the apparatus body 5 shown in FIG. 3 are mounted.

As shown in FIG. 1, the lid member 6 is supported at one side end side thereof for opening and closing motion in the direction of the arrow mark $a_1$ and the direction of the arrow mark $a_2$ in FIG. 1 and also for pivotal motion in the direction of the arrow mark $b_1$ and the direction of the arrow mark $b_2$ around an axis parallel to the plane of the lid member 6 or the display section 7 on the apparatus body 5 by a pivotal supporting mechanism 8. The pivotal supporting mechanism 8 includes a first pivot shaft 26 parallel to the principal surface 11 of the apparatus body 5, and a second pivot shaft 27 extending perpendicularly to the principal surface 11 of the apparatus body 5. The pivotal supporting mechanism 8 supports the lid member 6 for pivotal motion around the axes of the first and second pivot shafts 26 and 27.

Figure 6:
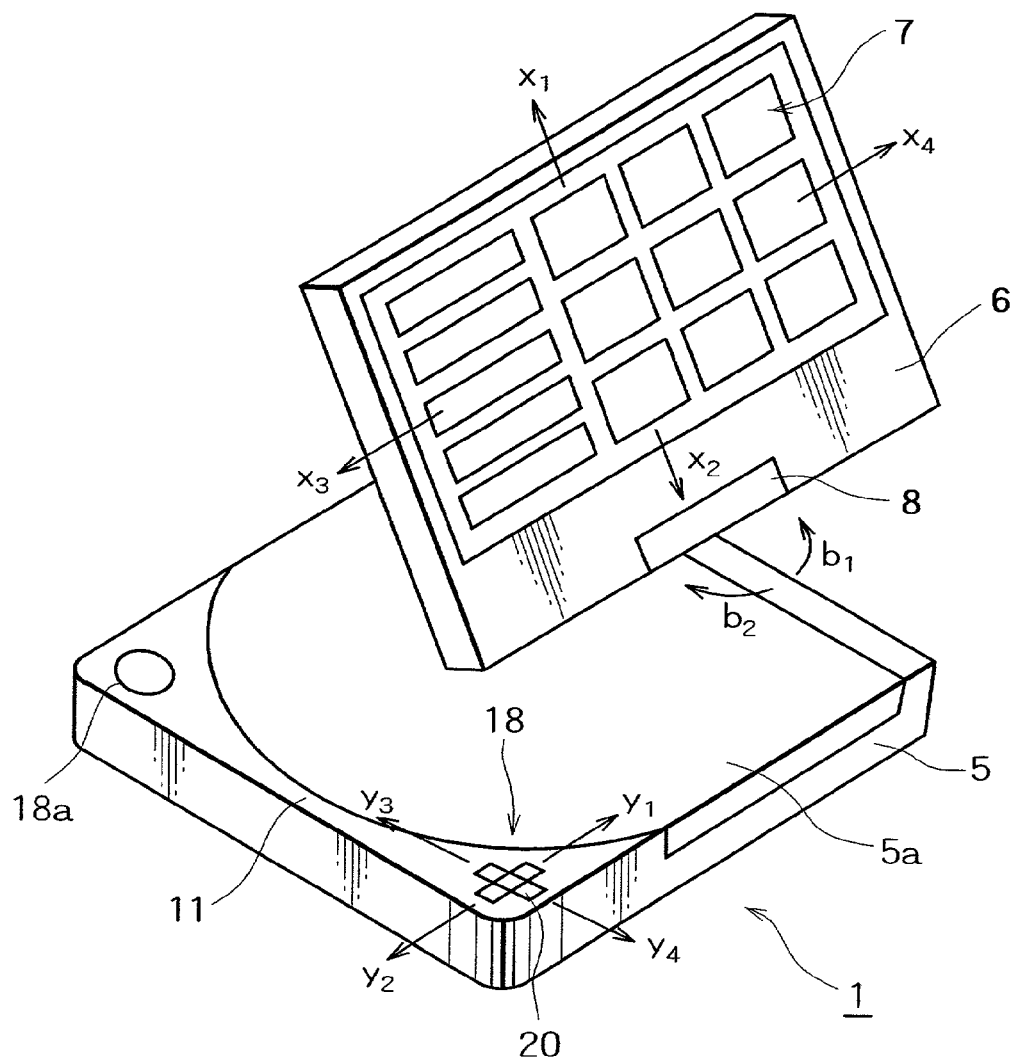
FIG. 6 is a perspective view of the disk player of FIG. 1 when it is in another state wherein the selection menu on the display screen is operated by the operation section.

As shown in FIG. 3, a detection switch 25 for detecting in which one of the direction of the arrow mark $b_1$ and the direction of the arrow mark $b_2$ in FIG. 1 the lid member 6 is pivoted, that is, for detecting a pivoted position of the lid member 6, with respect to the apparatus body 5 is disposed at a position in the apparatus body 5 in an opposing relationship to an outer periphery of the second pivot shaft 27. The detection switch 25 is pressed by an operation piece not shown provided on the second pivot shaft 27 or in the lid member 6, for example, when the lid member 6 is pivoted in the direction of the arrow mark $b_1$ or $b_2$ as shown in FIG. 6. A detection signal from the detection switch 25 is supplied to a control section which is hereinafter described.

In the disk player 1 described above, if the user operates the opening button 18a to pivot the accommodating lid 5a in the direction of the arrow mark $c_1$ and places an optical disk 4 onto the disk table 15 and then pivots the accommodating lid 5a in the direction of the arrow mark $c_2$ to close up the disk accommodating recess 12 with the accommodating lid 5a and thereafter operates the operation section 18, then the optical disk 4 placed on the disk table 15 is driven to rotate by the spindle motor 16 of the disk rotating driving mechanism 13 while information is read out from the optical disk 4 by the optical pickup 17 of the playback mechanism 14. A signal read out from the optical disk 4 by the optical pickup 17 is supplied to a decoding processing section 31. The decoding processing section 31 performs decoding processing for the output signal of the optical pickup 17 and supplies a resulting signal as a decoded output to a control section 32. The control section 32 supplies a control signal to a servo circuit 33 to control driving of the spindle motor 16 and the optical pickup 17. Of output data of the decoding processing section 31, video data are supplied to the display section 7 through a display driving circuit not shown while audio data are outputted as audible sound through a D/A converter and so forth not shown.

The control section 32 receives, through an interface 34, an operation signal from one of the switches 21a, 21b, 21c and 21d when an operation button 20 of the operation section 18 is selectively operated to be pushed in. The control section 32 supplies a control signal to the display section 7 in response to the operation signal for an operation direction originating from an operation of the operation button 20 by the user so that, for example, the cursor is moved in the upward, downward, leftward or rightward direction on the display face of the display section 7.

When the lid member 6 is pivoted in the direction of the arrow mark $b_1$ or $b_2$ in FIG. 1 relative to the apparatus body 5, the detection switch 25 is operated to output a detection signal, which is supplied to the control section 32. The control section 32 supplies a control signal to the interface 34 in response to the detection signal from the detection switch 25 to change over the setting of the operation directions by the operation button 20 depending upon whether the lid member 6 is in a state shown in FIG. 5 or in another state shown in FIG. 6 thereby to change over output signals of the switches 21a, 21b, 21c and 21d obtained when the end portions of the operation button 20 are operated.

Figure 4:
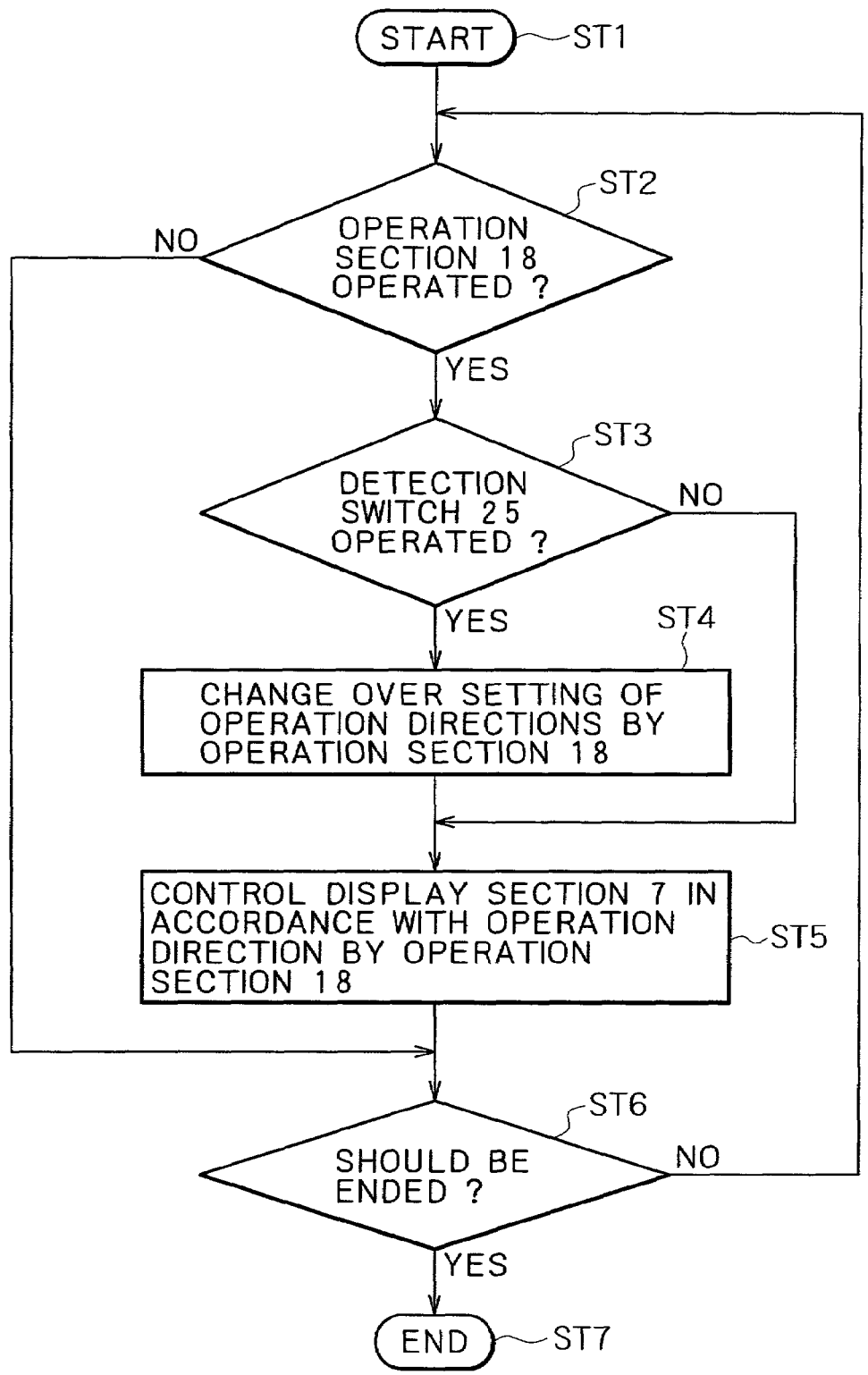
FIG. 4 is a flow chart illustrating a procedure for changing over the operation direction of the operation section shown in FIG. 2.

A changeover procedure of changing over the operation directions of the operation section 18 by the control section 32 of the disk player 1 is described with reference to FIG. 4. The disk player 1 starts the changeover procedure in step ST1, for example, in a state wherein an optical disk 4 is loaded in the disk player 1 and a selection screen such as a selection menu for selection of information as contents recorded on the optical disk 4 is displayed based on information read out from the optical disk 4. First in step ST2, the control section 32 discriminates whether or not an operation button 20 of the operation section 18 is operated. If the operation section 18 is operated, then the processing advances to step ST3. If the operation section 18 is not operated, then the processing advances to step ST6 which is hereinafter described. Detection of whether or not the operation section 18 is operated is based on, for example, from which one of the switches 21a, 21b, 21c and 21d an output signal is supplied to the control section 32.

When it is detected in step ST2 that the operation section 18 is operated, the control section 32 of the disk player 1 discriminates in step ST3 whether or not a detection element of the detection switch 25 is operated by the second pivot shaft 27 or some other element as described above. If it is discriminated in step ST3 that the detection switch 25 is operated, then the processing advances to step ST4. If it is discriminated in step ST3 otherwise that the detection switch 25 is not operated, then the processing advances to step ST6.

If it is discriminated in step ST3 that the detection switch 25 is operated, then the control section 32 changes over the setting of the operation directions by the operation section 18 in step ST4 and then controls the display section 7, for example, the movement of the cursor on the display section 7, in response to an operation direction of the operation section 18 in step ST5. In particular, for example, the cursor on the display face of the display section 7 of the disk player 1 is moved in one of the upward, downward, leftward and rightward directions in response to the operation direction of the operation section 18.

Figure 5:
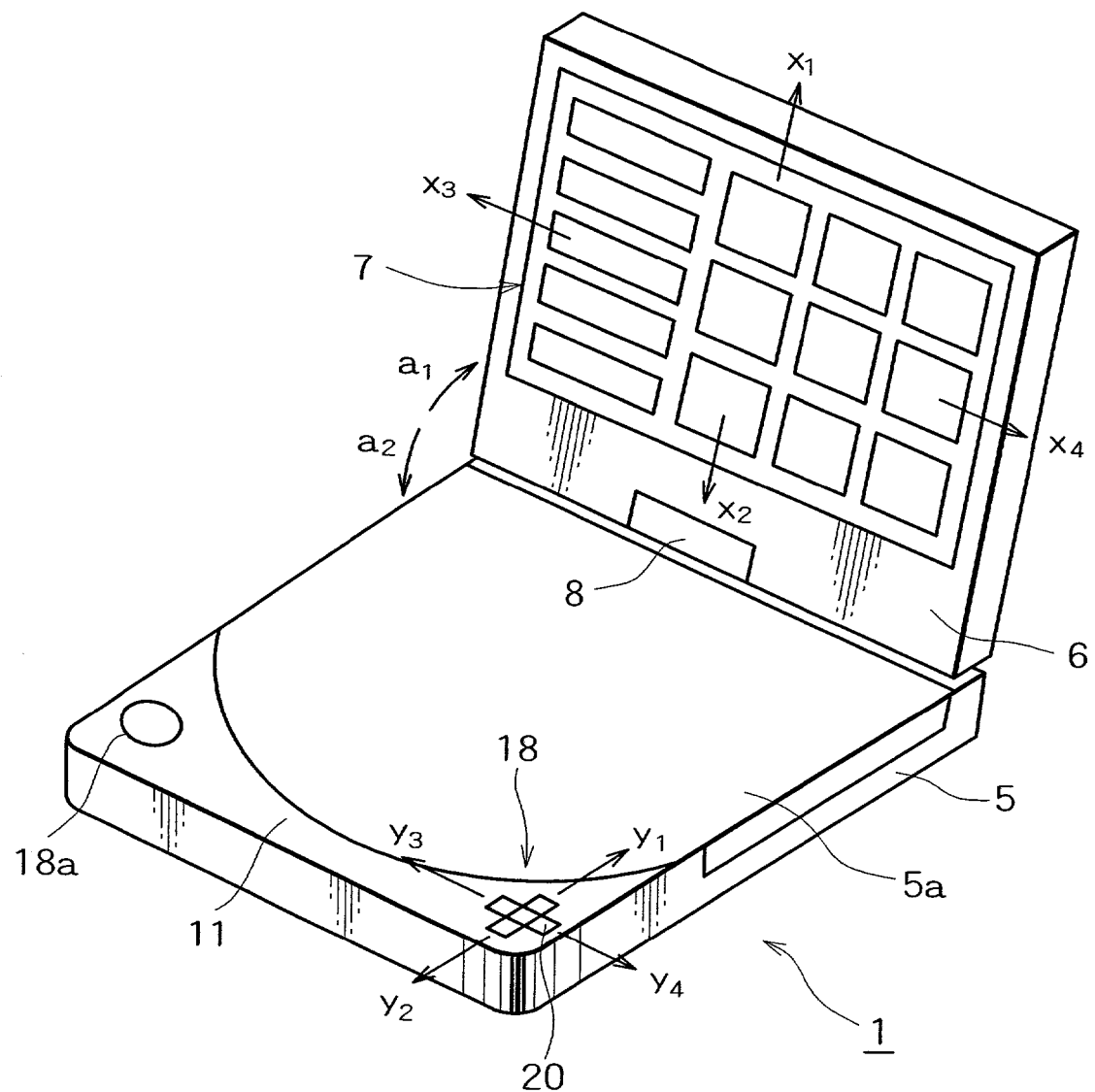
FIG. 5 is a perspective view of the disk player of FIG. 1 when it is in a state wherein a selection menu of a display screen of a display section is operated by the operation section.

Then, if the lid member 6 is pivoted from the state shown in FIG. 6 to the state shown in FIG. 5 around the second pivot shaft 27 and the detection switch 25 is operated to be changed over thereby, then the control section 32 of the disk player 1 discriminates whether or not the changeover procedure should be ended in step ST6. If it is discriminated in step ST6 that the changeover procedure should be ended, then the control section 32 ends the changeover procedure in step ST7. If it is discriminated in step ST6 that the changeover procedure should not be ended, then the processing returns to step ST2 so that the control section 32 repetitively executes the processing beginning with step ST2 described above.

Operation of the operation button 20 in response to the relative position between the display section 7 and the operation section 18 of the disk player 1 having such a configuration as described above is described now.

In the disk player 1, when information is to be played back from an optical disk 4, a selection menu for selection of information as a desired playback object from among a plurality of pieces of information as contents recorded on the optical disk 4 is displayed on the display face of the display section 7 based on information read out from the optical disk 4. Thus, if the user operates to push in a desired one of the end portions of the operation button 20 to move, for example, the cursor in the selection menu to select a desired playback object.

In the disk player 1, when the lid member 6 is pivoted in the direction of the arrow mark $a_1$ away from the apparatus body 5 until the display section 7 is directed to the front side of the apparatus body 5 as seen in FIG. 5, the directions of arrow marks $y_1$, $y_2$, $y_3$ and $y_4$ corresponding to the operation directions of the operation button 20 correspond to the directions of arrow marks $x_1$, $x_2$, $x_3$ and $x_4$ corresponding to the upward, downward, leftward and rightward directions on the display face of the display section 7. Accordingly, in the disk player 1, if the user operates to push down one of the end portions for the directions of the arrow marks $y_1$ and $y_2$ of the operation button 20 of the operation section 18, then the cursor or the like is moved in one of the directions of the arrow marks $x_1$ and $x_2$, which are the upward and downward directions, on the display face. Similarly, if the user operates to push down one of the end portions for the directions of the arrow marks $y_3$ and $y_4$ of the operation button 20, then the cursor or the like is moved in one of the directions of the arrow marks $x_3$ and $x_4$, which are the leftward and rightward directions, on the display face.

Then, if the lid member 6 is further pivoted in the direction of the arrow mark $b_1$ from the state wherein the lid member 6 is pivoted away from the apparatus body 5 as seen in FIG. 5 by the user until the display section 7 is directed to the left side face side of the apparatus body 5 as seen in FIG. 6, then the pivoted position of the display section 7 with respect to the apparatus body 5 is detected by the detection switch 25. Thus, in response to the detection signal from the detection switch 25 then, the control section 32 changes over the input signal generated by operation of the operation button 20 of the operation section 18 for each operation direction. In particular, if the user operates to push in one of the end portions for the directions of the arrow marks $y_1$ and $y_2$ of the operation button 20 of the operation section 18, then the cursor or the like is moved in one of the directions of the arrow marks $x_4$ and $x_3$, which are the rightward and leftward directions, on the display face. Similarly, if the user operates to push in one of the end portions for the directions of the arrow marks $y_3$ and $y_4$ of the operation button 20, then the cursor or the like is moved in one of the directions of the arrow marks $x_1$ and $x_2$, which are the upward and downward directions, on the display face.

On the other hand, though not shown, if the lid member 6 is further pivoted in the direction of the arrow mark $b_2$ from the state wherein the lid member 6 is pivoted away from the apparatus body 5 as seen in FIG. 5 by the user until the display section 7 is directed to the right side face side of the apparatus body 5, then the pivoted position of the display section 7 with respect to the apparatus body 5 is detected by the detection switch 25. Thus, in response to the detection signal from the detection switch 25 then, the control section 32 changes over the input signal generated by operation of the operation button 20 of the operation section 18 for each operation direction. In particular, if the user operates to push in one of the end portions for the directions of the arrow marks $y_1$ and $y_2$ of the operation button 20 of the operation section 18, then the cursor or the like is moved in one of the directions of the arrow marks $x_3$ and $x_4$, which are the leftward and rightward directions, on the display face. Similarly, if the user operates to push in one of the end portions for the directions of the arrow marks $y_3$ and $y_4$ of the operation button 20, then the cursor or the like is moved in one of the directions of the arrow marks $x_2$ and $x_1$, which are the downward and upward directions, on the display face.

In other words, in the disk player 1, the setting of the operation directions of the operation button 20 is changed over based on a result of detection of the direction of the display section 7, that is, the pivoted position of the lid member 6 in the direction of the arrow mark $b_1$ or the direction of the arrow mark $b_2$. Consequently, the user can operate the selection menu on the display face of the display section 7 sensually readily and with certainty using the operation button 20 in accordance with the direction of the display section 7.

In the disk player 1, the optical pickup 17 of the playback mechanism 14 is moved to a recording track, on which information as contents of a desired playback object of the optical disk 4 is recorded, based on a result (selection result) of operation of the operation section 18 by the user, and reads out the desired information from the optical disk 4. The information thus read out is decoded by the decoding processing section 31, and the desired information such as a video based on the read out information is displayed on the display section 7.

In the disk player 1 described above, the operation section 18 is provided on the principal surface 11 of the apparatus body 5. Now, a second disk player wherein an operation element is provided on a side face of an apparatus body is described with reference to the accompanying drawings. It is to be noted that the second disk player has a configuration similar to that of the disk player 1 described hereinabove except the operation section, and therefore, like components are denoted by like reference characters and overlapping description of them is omitted herein to avoid redundancy.

Figure 7:
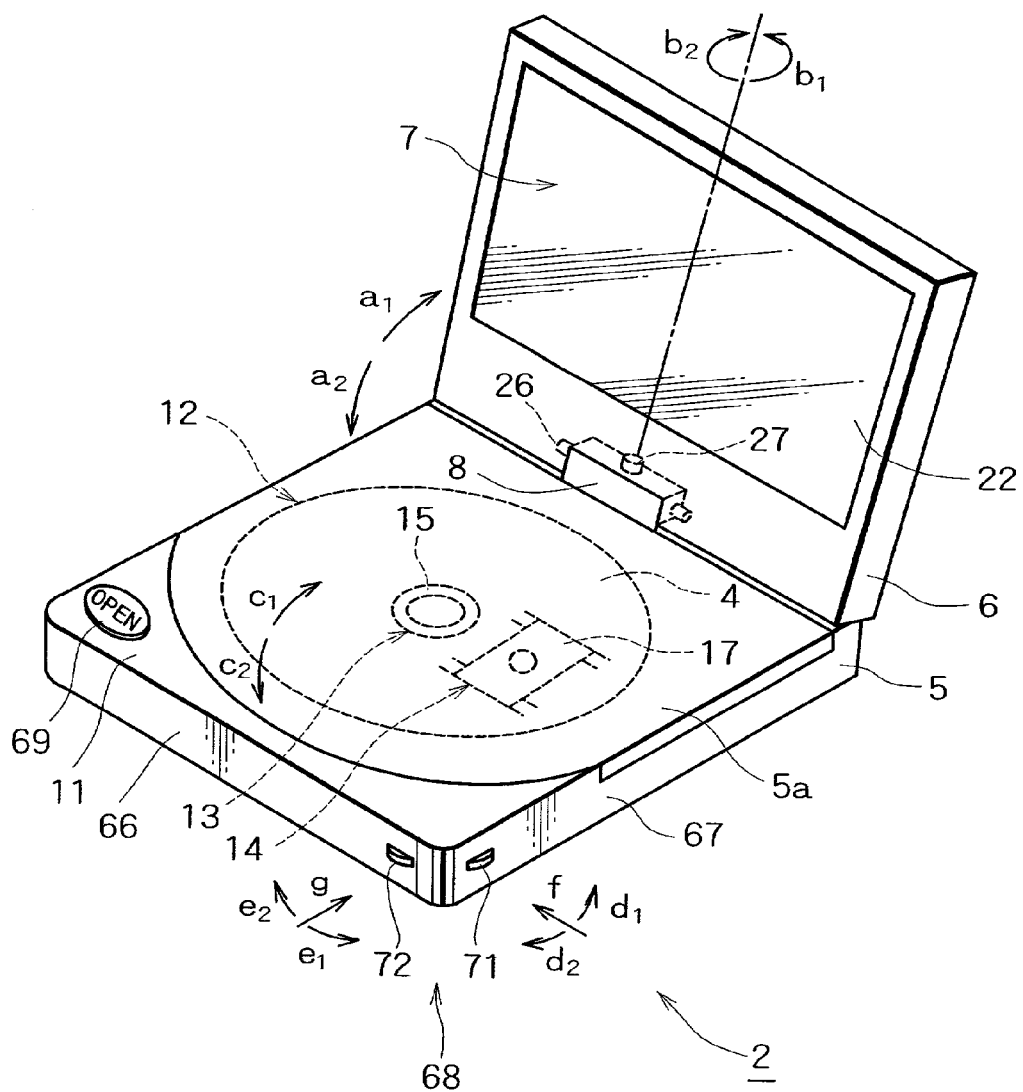
FIG. 7 is a perspective view showing another disk player according to the present invention.

The second disk player is shown in FIG. 7 and denoted by reference numeral 2. Referring to FIG. 7, the disk player 2 includes an apparatus body 5 for playing back information of a video, music and so forth from an optical disk 4 such as, for example, a DVD, and a lid member 6 provided for opening and closing motion in the direction of an arrow mark $a_1$ and the direction of another arrow mark $a_2$ and also for pivotal motion in the direction of an arrow mark $b_1$ and the direction of another arrow mark $b_2$ on the apparatus body 5 and having a display section 7 for displaying information based on a signal read out from the optical disk 4.

Figure 8:
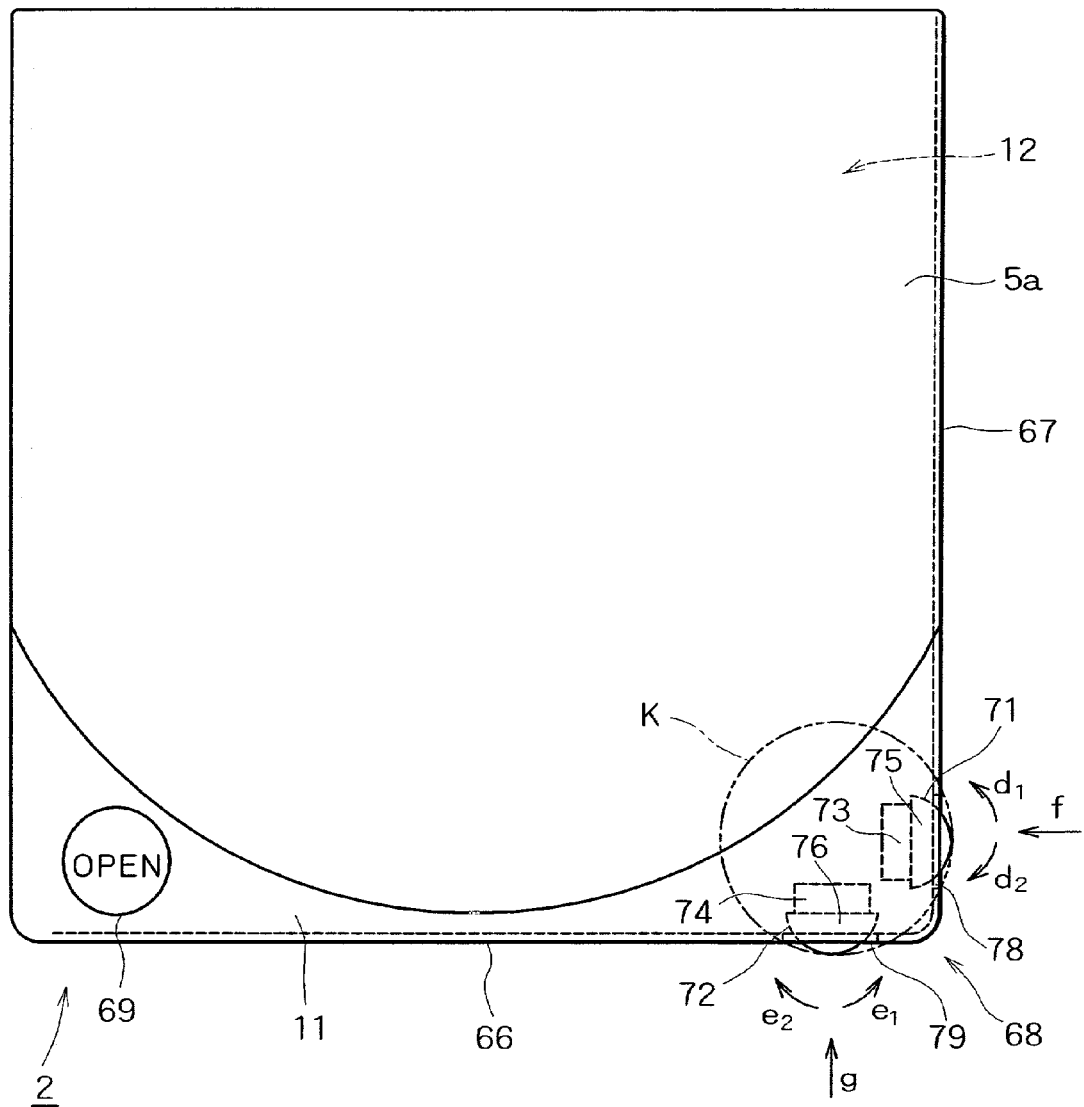
FIG. 8 is a plan view showing an operation section of the disk player shown in FIG. 7.

The apparatus body 5 is formed such that it has a shape of a box of a substantially quadrangular shape. As seen in FIGS. 7 and 8, a disk accommodating recess 12 into which the optical disk 4 is placed is provided on a principal surface 11 of the apparatus body 5 which is closed up with the display section 7. An accommodating lid 5a is mounted for pivotal opening and closing motion in the direction of an arrow mark $c_1$ and the direction of another arrow mark $c_2$ relative to the disk accommodating recess 12 on the apparatus body 5 as shown in FIG. 7 by a hinge mechanism not shown. The accommodating lid 5a is pivoted in the direction of the arrow mark $c_1$ by operation of an opening button 69 which is provided at a corner portion of the principal surface 11 of the apparatus body 5.

When the opening button 69 is operated, the accommodating lid 5a is pivoted in the direction of the arrow mark $c_1$, and in this state, an optical disk 4 is placed onto a disk table, which is hereinafter described, in the disk accommodating recess 12. As seen in FIG. 7, a disk rotating driving mechanism 13 for driving the optical disk 4 to rotate and a playback mechanism 14 for playing back information from the optical disk 4 are provided in the disk accommodating recess 12 of the apparatus body 5. The disk rotating driving mechanism 13 includes a disk table 15 for receiving an optical disk 4 placed thereon, and a spindle motor 16 for driving the disk table 15 to rotate. The playback mechanism 14 includes an optical pickup 17 for playing back information from the optical disk 4, and a feed mechanism not shown for moving the optical pickup 17 in a diametrical direction of the optical disk 4.

Figure 9:
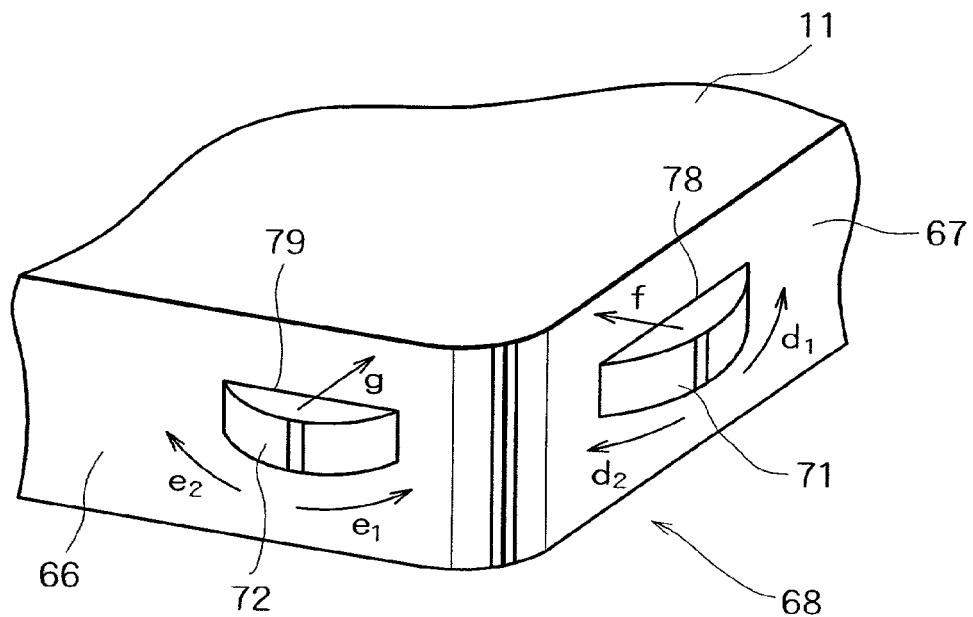
FIG. 9 is a perspective view showing the operation section shown in FIG. 8.
Figure 10:
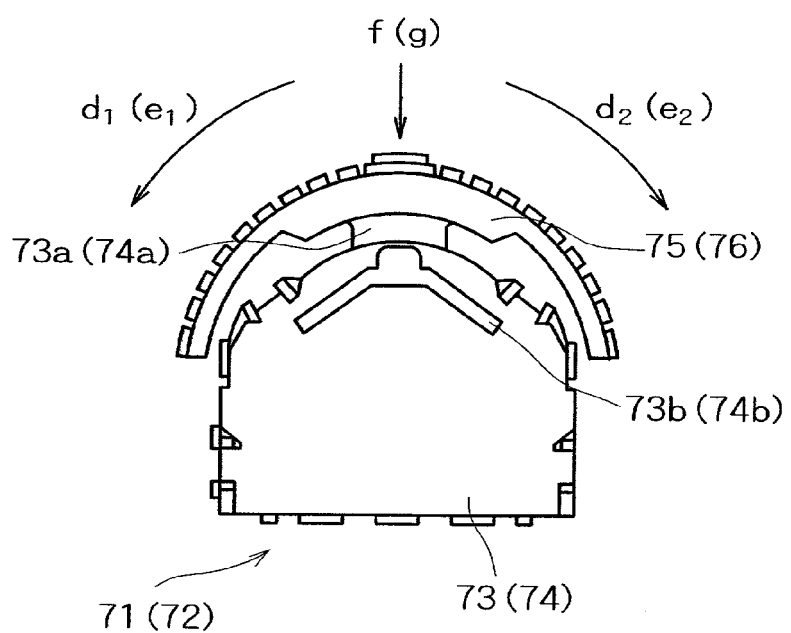
FIG. 10 is a plan view showing first and second operation elements of the operation section shown in FIG. 8.

An operation section 68 for operating the apparatus body 5 is disposed at a corner portion of the front end side of the principal surface 11 of the apparatus body 5 as shown in FIG. 8. The operation section 68 includes, as shown in FIGS. 9 and 10, a first operation element 71 and a second operation element 72 provided on side faces 66 and 67 extending perpendicularly to the principal surface 11 of the apparatus body 5 and positioned adjacent each other such that they project outwardly from the apparatus body 5, respectively. Each of the first and second operation elements 71 and 72 is formed as a unitary member made of a synthetic resin material and includes a base portion 73 or 74 having a resilient displacement portion 73a or 74a and an opening portion 73b or 74b formed thereon and therein, respectively, and an arcuate operating piece 75 or 76 operated for movement relative to the base portion 73 or 74. Further, first and second operation slits 78 and 79 are formed in the side faces 66 and 67, and the operating pieces 75 and 76 of the first and second operation elements 71 and 72 are inserted in the first and second operation slits 78 and 79, respectively. In particular, outer peripheries of the operating pieces 75 and 76 are partially inserted in the first and second operation slits 78 and 79 such that the operating pieces 75 and 76 project outwardly of the apparatus body 5.

As shown in FIGS. 9 and 10, the first operation element 71 is provided such that the operating piece 75 can be operated to pivot in the direction of an arrow mark $d_1$ and the direction of another arrow mark $d_2$ in FIG. 9 through resilient deformation of the resilient displacement portion 73a and can be operated to be pushed in in the direction of an arrow mark f in FIG. 9 through deformation of a thin material portion which forms the opening portion 73b of the base portion 73. Similarly, the second operation element 72 is provided such that the operating piece 76 can be operated to pivot in the direction of an arrow mark $e_1$ and the direction of another arrow mark $e_2$ in FIG. 9 through resilient deformation of the resilient displacement portion 74a and can be operated to be pushed in in the direction of an arrow mark g in FIG. 9 through deformation of a thin material portion which forms the opening portion 74b. If the operating piece 75 or 76 of the first operation element 71 or 72 is operated to be pushed in in the direction of the arrow mark f or g, then the first or second operation element 71 or 72 is moved in the direction of the arrow mark f or g to operate a detection switch not shown. An output signal of the detection switch not shown is supplied to a control section. Similarly, if the operating piece 75 or 76 is operated to be pivoted in the direction of the arrow mark $d_1$ or $d_2$ or the arrow mark $e_1$ or $e_2$, then a detection mechanism such as a detection switch not shown is operated and a detection signal thereof is supplied to the control section.

When the user wants to play back desired information from the optical disk 4, if the user operates the first operation element 71 of the operation section 68 to pivot in the direction of the arrow mark $d_1$ or the direction of the arrow mark $d_2$, then, for example, a cursor or the like can be moved in the direction of an arrow mark $x_1$ or $x_2$ in FIG. 5, which is an upward or downward direction, on the screen of the display section 7 to select, from within a list of playback contents and so forth displayed as a selection menu on the display section 7, desired playback contents. Further, if the user operates the second operation element 72 of the operation section 68 to pivot in the direction of the arrow mark $e_1$ or the direction of the arrow mark $e_2$, then, for example, the cursor or the like can be moved in the direction of an arrow mark $x_3$ or $x_4$ in FIG. 5, which is a leftward or rightward direction, on the screen of the display section 7 to select, from within a list of playback contents and so forth displayed as a selection menu on the display section 7, desired playback contents. If the first or second operation element 71 or 72 is operated to be pushed in in the direction of the arrow mark f or the arrow mark g, then a playback object or the like selected from among selection items of the selection menu displayed on the display section 7 can be determined.

Figure 11:
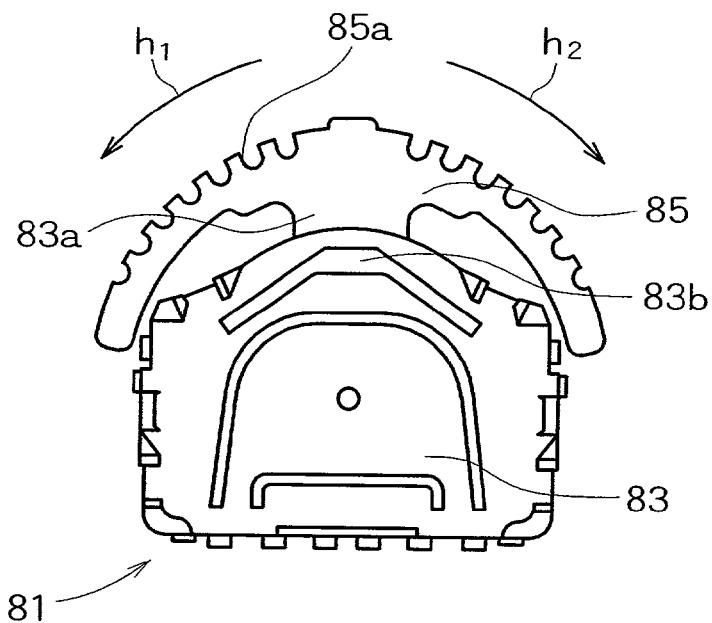
FIGS. 11 and 12 are plan views showing different operation elements.
Figure 12:
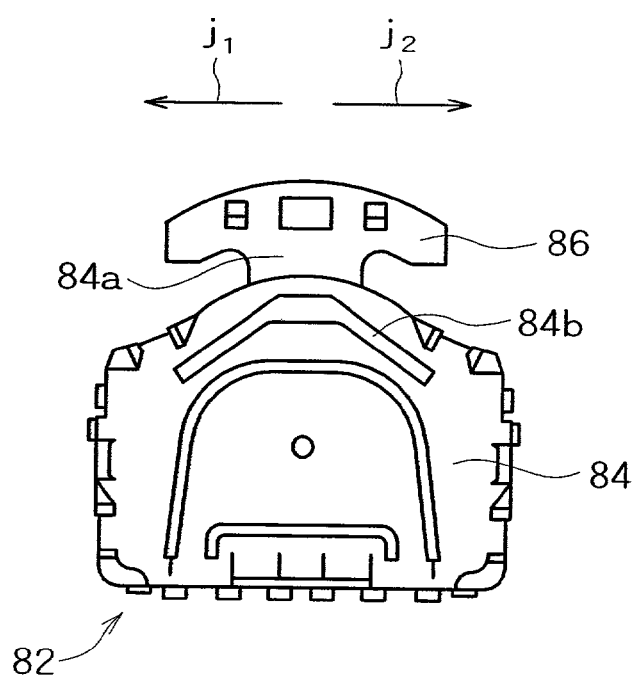

Each of the first and second operation elements 71 and 72 shown in FIG. 10 is configured such that the operating piece 75 or 76 can be operated to pivot and operated to be pushed in relative to the base portion 73 or 74 through the resilient displacement portion 73a or 74a. The configuration shown in FIG. 10, however, may be replaced by such a configuration as shown in FIG. 11 or 12. Referring first to FIG. 11, an operation element 81 shown has a base portion 83, an operating piece 85 having rough portion 85a formed at a portion thereof which projects outwardly from the apparatus body 5 for being operated to be pivoted in the direction of an arrow mark $h_1$ or the direction of another arrow mark $h_2$ by the user, a resilient displacement portion 83*a* for interconnecting the base portion 83 and the operating piece 85, and an opening portion 83*b* formed therein. The base portion 83, operating piece 85 and resilient displacement portion 83*a* are formed integrally from a synthetic resin material. In the operation element 81 shown in FIG. 11, if the operating piece 85 is operated to pivot in the direction of the arrow mark $h_1$ or the arrow mark $h_2$ by the user, then the resilient displacement portion 83*a* and a thin material portion which forms the opening portion 83*b* of the base portion 83 are resiliently deformed. When the operating piece 85 is operated to be pivoted in the direction of the arrow mark $h_1$ or the arrow mark $h_2$, the detection mechanism such as a detection switch not shown is operated, and a detection signal from the detection mechanism is supplied to the control section of the disk player 2. On the other hand, an operation element 82 shown in FIG. 12 has a base portion 84 having an opening portion 84*b*, and an operating piece 86 for being operated in the direction of an arrow mark $j_1$ or the direction of another arrow mark $j_2$ by the user. The operating piece 86 and the base portion 84 are formed integrally from a synthetic resin material such that the operating piece 86 projects from the base portion 84 through a resilient displacement portion 84*a*. If the operating piece 86 is operated in the direction of the arrow mark $j_1$ or the direction of the arrow mark $j_2$ by the user, then the resilient displacement portion 84*a* and a thick material portion of the base portion 84 around the opening portion 84*b* are resiliently deformed. When the operating piece 86 is operated in the direction of the arrow mark $j_1$ or the direction of the arrow mark $j_2$, the detection mechanism such as a detection switch is operated, and a detection signal from the detection mechanism is supplied to the control section of the disk player 2.

Also it is possible to provide such an operation feeling as if the user operated to rotate a single disk, for example, by disposing the first and second operation elements 71 and 72 such that the outer peripheries of the operating pieces 75 and 76 which project outwardly of the apparatus body 5 through the first and second operation slits 78 and 79 inscribe a circle K indicated imaginarily by an alternate long and two short dashes line in FIG. 8.

Though not shown in the drawings, external output terminals for outputting signals of a video, music and so forth to an external display apparatus such as a monitor display unit are provided on the apparatus body 5. If the external output terminals are connected to the external display apparatus when necessary, then it is possible, for example, to display a video displayed on the display section 7 in an enlarged scale on the external display apparatus.

The lid member 6 has a principal surface formed with a size substantially equal to the size of an outer profile of the principal surface 11 of the apparatus body 5 as seen in FIG. 7, and the display section 7 is provided on a face of the lid member 6 confronting with the apparatus body 5. The display section 7 has a liquid crystal display device 22 electrically connected to a circuit board provided in the apparatus body 5.

The lid member 6 is supported at one side end side thereof for opening and closing motion in the direction of an arrow mark $a_1$ and the direction of another arrow mark $a_2$ and also for pivotal motion in the direction of an arrow mark $b_1$ and the direction of another arrow mark $b_2$ on and with respect to the apparatus body 5 by the pivotal supporting mechanism 8. As shown in FIG. 7, the pivotal supporting mechanism 8 includes a first pivot shaft 26 extending in parallel to the principal surface 11 of the apparatus body 5, and a second pivot shaft 27 extending perpendicularly to the principal surface 11 of the apparatus body 5. The pivotal supporting mechanism 8 supports the lid member 6 for pivotal motion around the axes of the first and second pivot shafts 26 and 27.

Though not shown, a detection switch for detecting a pivoted position of the display section 7 of the lid member 6, which is pivoted in the direction of the arrow mark $b_1$ or the direction of the arrow mark $b_2$ with respect to the apparatus body 5, is disposed at a position in the apparatus body 5 in an opposing relationship to an outer periphery of the second pivot shaft 27. Similarly as in the disk player 1 described hereinabove, the detection switch is operated by the pivotal motion of the lid member 6 in the direction of the arrow mark $b_1$ or the direction of the arrow mark $b_2$ by an operation piece not shown provided on the second pivot shaft 27 or in the lid member 6.

Operation of the first and second operation elements 71 and 72 of the operation section 68 in response to a relative position between the display section 7 and the operation section 68 in the disk player 2 having such a configuration as described above is described below.

In the disk player 2 described above, an optical disk 4 placed on the disk table 15 is driven to rotate by the disk rotating driving mechanism 13, and information is read out from the optical disk 4 by the optical pickup 17 of the playback mechanism 14.

Figure 13:
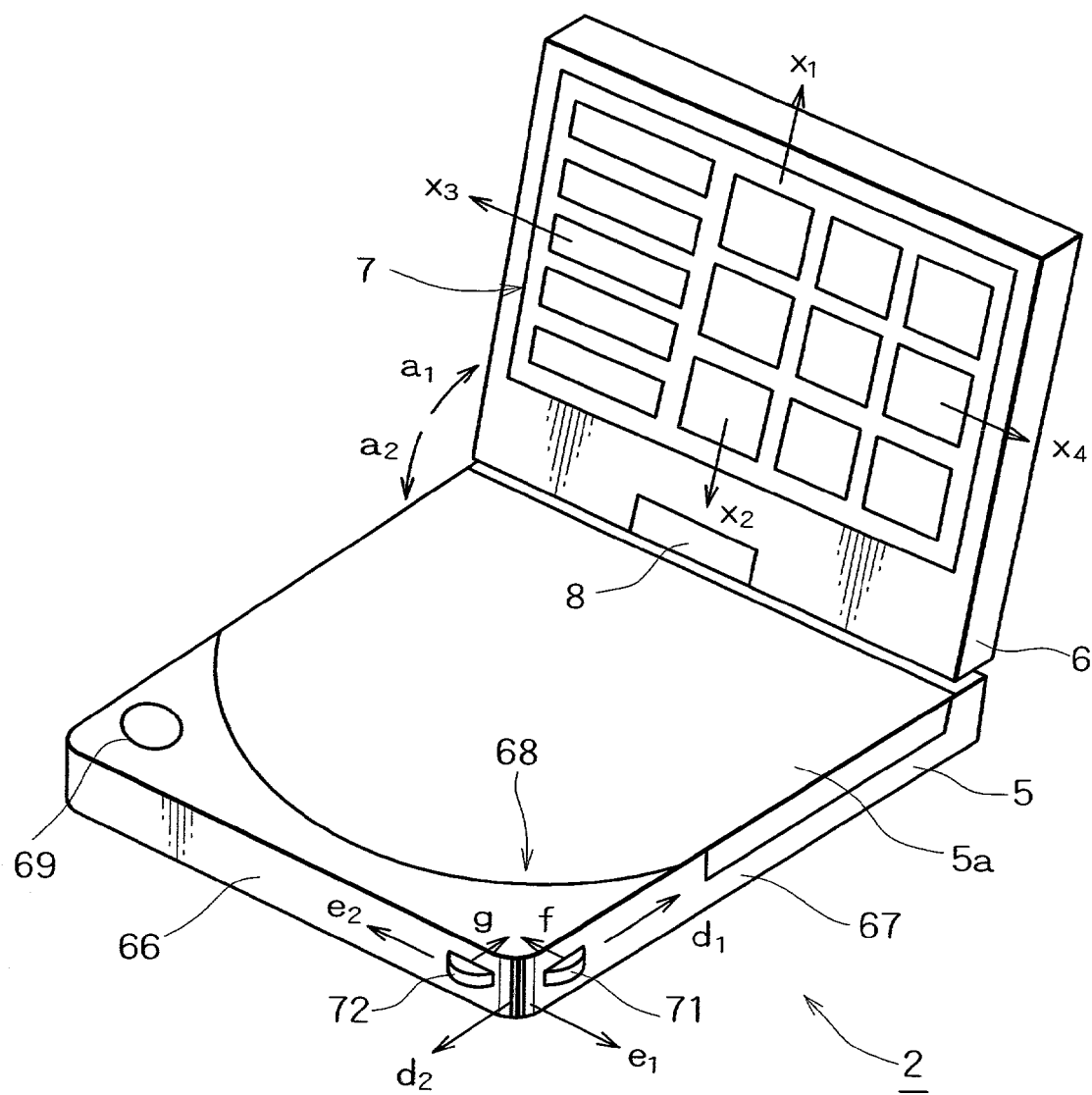
FIG. 13 is a perspective view showing the disk player shown in FIG. 7 when it is in a state wherein a selection menu on a display section is operated by the operation section.

When the disk player 2 reads out information recorded on the optical disk 4, a selection menu for selection of information as contents of desired playback objects recorded on the optical disk 4 is displayed on the display face of the display section 7, for example, as seen in FIG. 13. Thus, if the first and second operation elements 71 and 72 are operated to pivot, then, a cursor or the like is moved in the selection menu to select information as contents which may be a desired playback object.

When the lid member 6 of the disk player 2 is pivoted in the direction of the arrow mark $a_1$ away from the apparatus body 5 until the display section 7 is directed to the front side of the apparatus body 5 as seen in FIG. 13, the directions of arrow marks $d_1$, $d_2$, $e_1$ and $e_2$ as the operation directions of the first and second operation elements 71 and 72 correspond to the directions of arrow marks $x_1$, $X_2$, $X_3$ and $X_4$ corresponding to the upward, downward, leftward and rightward directions on the display face of the display section 7. Accordingly, in the disk player 2, if the user operates to pivot the first operation element 71 of the operation section 68 in the direction of the arrow mark $d_1$ or $d_2$, then the cursor or the like displayed on the display section 7 is moved in one of the directions of the arrow marks $x_1$ and $x_2$, which are the upward and downward directions. Similarly, if the user operates to pivot the second operation element 72 in the direction of the arrow mark $e_1$ or $e_2$, then the cursor or the like displayed on the display section 7 is moved in one of the directions of the arrow marks $x_4$ and $x_3$, which are the rightward and leftward directions.

Figure 14:
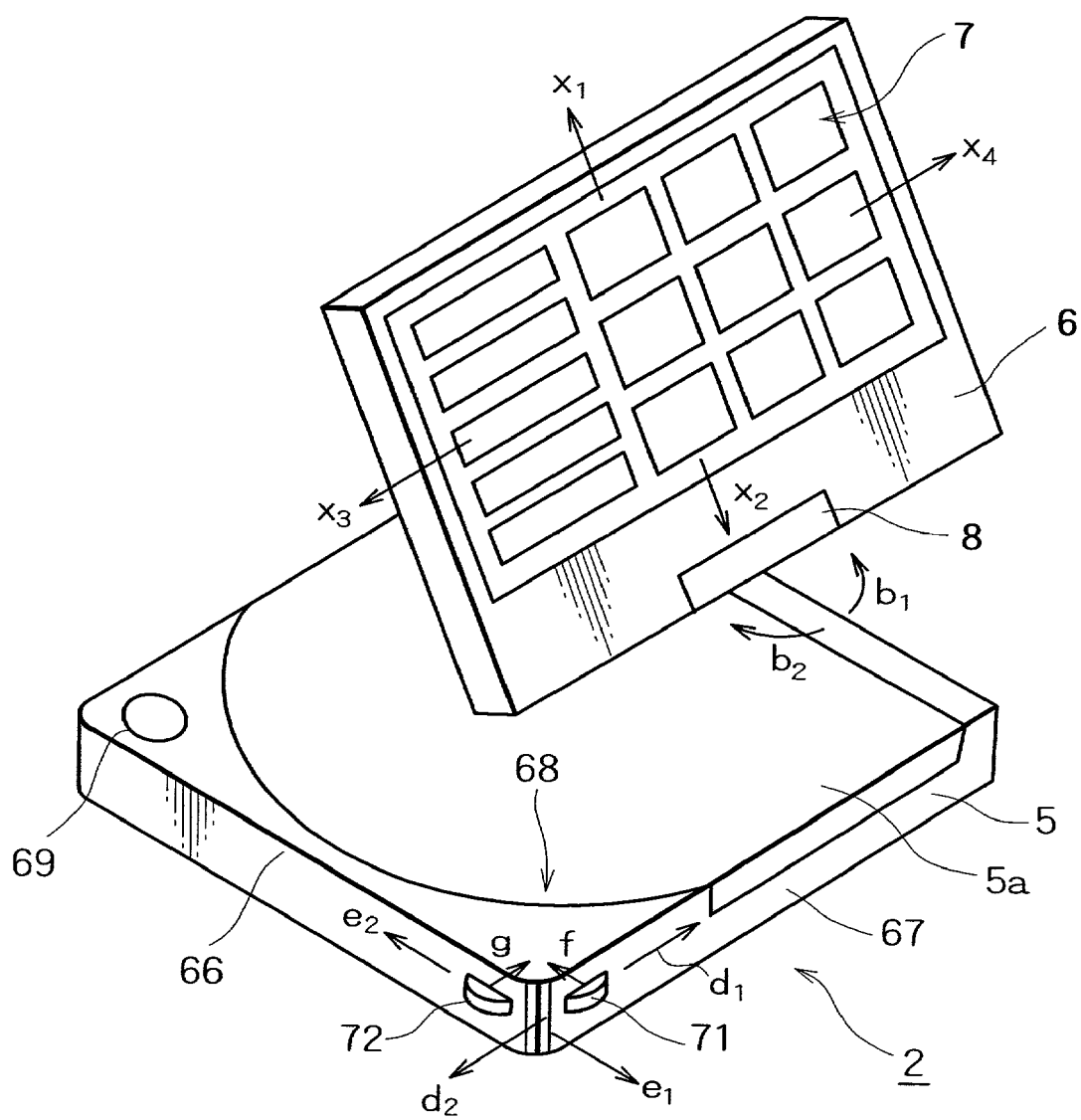
FIG. 14 is a perspective view showing the disk player shown in FIG. 7 but when it is in another state wherein the selection menu on the display section is operated by the operation section.

Then, as seen in FIG. 14, if the lid member 6 of the disk player 2 is further pivoted in the direction of the arrow mark $b_1$ from the state shown in FIG. 13 wherein the lid member 6 is pivoted away from the apparatus body 5 until the display section 7 is directed to the left side face side of the apparatus body 5, then the pivoted position of the display section 7 provided on the apparatus body 5 is detected by the detection switch described hereinabove. Thus, in response to the detection signal from the detection switch then, the control section discriminates based on the detection signal from the detection switch that the display section 7 is pivoted to the position shown in FIG. 14 and changes over the input signals generated by operation of the first operation element 71 and the second operation element 72 of the operation section 68. In particular, if the user operates to pivot the first operation element 71 of the operation section 68 in the direction of the arrow mark $d_1$ or $d_2$, then the control section of the disk player 2 moves the cursor or the like displayed on the display section 7 in one of the directions of the arrow marks $x_4$ and $x_3$, which are the rightward and leftward directions of the display screen. Similarly, if the user operates to pivot the second operation element 72 in the direction of the arrow mark $e_1$ or $e_2$, then the control section of the disk player 2 moves the cursor or the like displayed on the display section 7 in one of the directions of the arrow marks $x_1$ and $x_2$, which are the upward and downward directions of the display screen.

On the other hand, though not shown, if the lid member 6 is further pivoted in the direction of the arrow mark $b_2$ from the state shown in FIG. 13 wherein the lid member 6 is pivoted away from the apparatus body 5 until the display section 7 is directed to the right side face side of the apparatus body 5, then the pivoted position of the display section 7 provided on the apparatus body 5 is detected by the detection switch described hereinabove. Thus, based on the detection signal from the detection switch then, the control section of the disk player 2 discriminates that the display section 7 is pivoted to the position directed to the right side face side of the apparatus body 5 and changes over the input signals generated by operation of the first and second operation elements 71 and 72 of the operation section 68 for each operation direction. In particular, if the user operates to pivot the first operation element 71 of the operation section 68 in one of the directions of the arrow marks $d_1$ and $d_2$, then the control section of the disk player 2 moves the cursor or the like displayed on the display section 7 in one of the directions of the arrow marks $x_3$ and $x_4$, which are the leftward and rightward directions of the display screen. Similarly, if the user operates to pivot the second operation element 72 in one of the directions of the arrow marks $e_1$ and $e_2$, then the control section of the disk player 2 moves the cursor or the like displayed on the display section 7 in one of the directions of the arrow marks $x_2$ and $x_1$, which are the downward and upward directions of the display screen.

In other words, in the disk player 2, the operation directions by the first operation element 71 and the second operation element 72 of the operation section 68 are changed over based on a result of detection of in which one of the direction of the arrow mark $b_1$ and the direction of the arrow mark $b_2$ in FIG. 13 the lid member 6 is pivoted. Consequently, the user can operate the selection menu on the display face of the display section 7 sensually readily and with certainty in accordance with the direction of the lid member 6, that is, the display section 7, with respect to the apparatus body 5.

The user can operate to pivot the first or second operation element 71 or 72 of the operation section 68 in the direction of the arrow mark $d_1$ or the direction of the arrow mark $d_2$ or in the direction of the arrow mark $e_1$ or the direction of the arrow mark $e_2$ in accordance with the direction of the display section 7 with respect to the apparatus body 5 without the necessity to change over the operations of the first and second operation elements 71 and 72 in accordance with the direction of the display section 7 with respect to the apparatus body 5. In response to the pivoting operation of the first or second operation element 71 or 72, the cursor is moved to select, for example, information as contents of a desired playback object from among a plurality of kinds of information as contents recorded on the optical disk 4 in a list of playback contents displayed as a selection menu on the display section 7. Then, if the first or second operation element 71 or 72 is operated to be pushed in in the direction of the arrow mark f or the direction of the arrow mark g, then information as contents which becomes a playback object corresponding to the selected item is decided.

As a result, the control section of the disk player 2 controls to move the optical pickup 17 of the playback mechanism 14 to a recording track, on which information as the selected contents of the optical disk 4 is recorded, based on an operation input signal of the operation section 68, and reads out an information signal as contents of the desired playback object from the optical disk 4. The information thus read out is decoded by a decoding section, and the selected information such as a video is displayed on the display section 7.

The operation section 68 may be configured such that it changes over its operation mode in the following manner in response to a pushing-in operation of the first or second operation element 71 or 72 in the direction of the arrow mark f or the direction of the arrow mark g. For example, the operation section 68 may be configured such that, when the first or second operation element 71 or 72 is used to change over the playback condition of the optical disk 4 on the disk player 2, if the second operation element 72 is operated to pivot in the direction of the arrow mark $e_1$ or $e_2$ in a state wherein the first operation element 71 is operated to be pushed in in the direction of the arrow mark f when information relating to moving pictures read out from the optical disk 4 is to be played back or in a like case, then the screen displayed on the display section 7 is fed fast or fed back fast. In this instance, the operation section 68 may be configured such that, when the first operation element 71 is operated to pivot in the direction of the arrow mark $d_1$ or $d_2$ in a state wherein the second operation element 72 is operated to be pushed in in the direction of the arrow mark g, increase or decrease of the volume of the sound output may be performed.

As described above, with the disk player 2, since the first and second operation elements 71 and 72 are exposed to the outside while the display section 7 covers the principal surface 11 of the apparatus body 5, a pivoting operation or a pushing-in operation of each of the first and second operation elements 71 and 72 can be performed while the principal surface 11 of the apparatus body 5 is covered with the display section 7. For example, if an external display apparatus is connected to external output terminals not shown of the disk player 2, then a cursor displayed on the external display apparatus can be moved using the first or second operation element 71 or 72 even where the lid member 6 covers the apparatus body 5. Consequently, the operability can be improved significantly. In this instance, the display section 7 may be rendered inoperative.

With the disk player 2, since the first and second operation elements 71 and 72 are disposed on the side faces 66 and 67 of the apparatus body 5, the portability of the apparatus body 5 can be maintained without inviting increase in size of the apparatus body 5.

It is to be noted that, while the disk players 1 and 2 described above are configured such that information played back from an optical disk 4 is displayed on a display section, each of them may be configured otherwise such that external output terminals are provided on the apparatus body 5 and information played back, for example, from a video CD (Video Compact Disc) or an analog type optical video disk or a signal of a TV (Television) broadcast, which is supplied through the external input terminals, is displayed. The electronic apparatus according to the present invention can be applied suitably to a video camera apparatus and other apparatus of the portable type wherein a display section is provided for pivotal motion on an apparatus body.

In the embodiments described above, the control section detects in which one of the direction of the arrow mark $b_1$ and the direction of the arrow mark $b_2$ the lid member pivoted in the direction of the arrow mark $a_1$ is pivoted to change over the input signals from the operation section. Naturally, however, the control section may otherwise change over the setting of the operation section or interpret input signals from the operation section in a different way to change over the directions of movement of a cursor, an arrow mark, a symbol and so forth displayed on the display screen of the display section depending upon in which one of the direction of the arrow mark $b_1$ and the direction of the arrow mark $b_2$ the lid member is pivoted.

While the electronic apparatuses according to the embodiments of the present invention are configured such that an optical disk as an information recording medium is played back, the present invention can be applied also to a recording and/or playback apparatus which uses an information recording medium such as a disk cartridge having a magneto-optical disk or a memory card or an information storage section such as a hard disk apparatus which includes a magnetic disk. The electronic apparatus according to the present invention may be applied also to a video camera apparatus which uses, for example, a magnetic tape or a semiconductor memory card as a recording medium and wherein a display section is provided for pivotal motion on an apparatus body.

While preferred embodiments of the present invention have been described using specific terms, such description is for illustrative purposes only, and it is to be understood that changes and variations may be made without departing from the spirit or scope of the following claims.

What is claimed is:

1. An electronic apparatus, comprising:
   an apparatus body having a playback section;
   a lid member having a display section, provided on one face of said lid member, for receiving a signal from said playback section;
   a supporting mechanism provided between said apparatus body and said lid member for supporting said lid member on said apparatus body, said supporting mechanism enabling pivotal motion around a first axis parallel to the plane of said apparatus body between a first position, wherein said lid member covers an upper face of said apparatus body, and a second position, wherein said lid member uncovers the upper face of said apparatus body, and said supporting mechanism also enabling pivotally rotational motion around a second axis parallel to the plane of said lid member at the second position while said lid member is attached to said apparatus body, such that said first axis is substantially perpendicular to said second axis;
   an operation section provided on said apparatus body, said operation section including first and second rotatable operation elements provided on two side faces of said apparatus body which intersect with each other, said first and second rotatable operation elements positioned within an area of a single circle such that when said first and second rotatable operation elements are operated together, a user is provided with an operation feeling of rotating a single disk; and
   a control section provided on said apparatus body for receiving an input signal supplied thereto from said operation section, said control section changing over a direction of movement of a cursor displayed on said display section based on the input signal from said operation section in response to a state of said lid member pivotally rotated around the second axis,
   wherein said first and second rotatable operation elements disposed on said two side faces of said apparatus body enables said control section to control the movement of the cursor displayed on said display section even when said lid member covers said upper face of said apparatus body.

2. An electronic apparatus according to claim 1, further comprising a detection section for detecting in which one of directions around the second axis said lid member is pivotally rotated, wherein an output of said detection section is supplied to said control section.

3. An electronic apparatus according to claim 1, wherein said operation section comprises a substantially cross-shaped operation button; and
   the cursor displayed on said display section is moved in one of upward, downward, leftward and rightward directions in a display screen of said display section in response to an operation of said operation button.

4. An electronic apparatus according to claim 3, further comprising a plurality of switches provided at positions of said apparatus body at which said switches are operated by operating end portions of said operation button.

5. An electronic apparatus according to claim 1, wherein said first and second operation elements are provided in such a manner as to project outwardly from said respective side faces of said apparatus body.

6. An electronic apparatus according to claim 5, wherein said first and second operation elements are provided for pivotal motion around axes perpendicular to the principal surface of said apparatus body.

7. An electronic apparatus, comprising:
   an apparatus body having a playback section;
   a lid member having a display section, provided on one face of said lid member, for receiving a signal from said playback section;
   a supporting mechanism provided between said apparatus body and said lid member for supporting said lid member on said apparatus body, said supporting mechanism enabling pivotal motion around a first axis parallel to the plane of said apparatus body between a first position, wherein said lid member covers an upper face of said apparatus body, and a second position, wherein said lid member uncovers the upper face of said apparatus body, and said supporting mechanism also enabling pivotally rotational motion around a second axis parallel to the plane of said lid member at the second position while said lid member is attached to said apparatus body, such that said first axis is substantially perpendicular to said second axis;
   a detection section provided for said apparatus body for detecting in which one of directions around the second axis said lid member is pivotally rotated;
   an operation section provided on said apparatus body, said operation section including first and second rotatable operation elements provided on two side faces of said apparatus body which intersect with each other, said first and second rotatable operation elements positioned within an area of a single circle such that when said first and second rotatable operation elements are operated together, a user is provided with an operation feeling of rotating a single disk; and a control section provided on said apparatus body for receiving a detection signal and an input signal supplied thereto from said detection section and said operation section, respectively, said control section changing over an operation based on the input signal from said operation section in response to the detection signal supplied thereto from said detection section, wherein said first and second rotatable operation elements disposed on said two side faces of said apparatus body enables said control section to control the movement of the cursor displayed on said display section even when said lid member covers said upper face of said apparatus body.

8. An electronic apparatus according to claim 7, wherein said control section changes over the input signal from said operation section in response to the detection signal supplied thereto from said detection section.

9. An electronic apparatus according to claim 8, wherein said control section changes over a direction of movement of a cursor displayed on said display section based on the input signal from said operation section in response to the state of said lid member pivotally rotated around the second axis.

10. An electronic apparatus according to claim 7, wherein said control section changes over setting of said operation section in response to the detection signal supplied thereto from said detection section.

11. An electronic apparatus according to claim 10, wherein said control section changes over the direction of movement of the cursor displayed on said display section based on the input signal from said operation section in response to the state of said lid member pivotally rotated around the second axis.

12. An electronic apparatus according to claim 7, wherein said operation section comprises a substantially cross-shaped operation button; and the cursor displayed on said display section is moved in one of upward, downward, leftward and rightward directions in a display screen of said display section in response to an operation of said operation button.

13. An electronic apparatus according to claim 12, further comprising a plurality of switches provided at positions of said apparatus body at which said switches are operated by operating end portions of said operation button.

14. An electronic apparatus according to claim 7, wherein said first and second operation elements are provided in such a manner as to project outwardly from said respective side faces of said apparatus body.

15. An electronic apparatus according to claim 14, wherein said first and second operation elements are provided for pivotal motion around axes perpendicular to the principal surface of said apparatus body.

16. An electronic apparatus, comprising:

a lid member having a display section provided on one face thereof an apparatus body having an electric circuit section for supplying a signal to said display section, said electric circuit section and said display section being electrically connected to each other;

a supporting mechanism provided on said apparatus body and having a first pivotal axis and a second pivotal axis, wherein the first pivotal axis extends substantially in parallel to a principal surface of said apparatus body, said lid member is pivotally moved around the first pivotal axis between a first position wherein said lid member covers an upper face of said apparatus body and a second position wherein said lid member uncovers the upper face of said apparatus body, the second pivotal axis extends in parallel to the plane of said lid member pivoted to the second position and said lid member is pivotally rotated around the second axis while said lid member is attached to said apparatus body, such that said first axis is substantially perpendicular to said second axis;

an operation section provided on said apparatus body, said operation section including first and second rotatable operation elements provided on two side faces of said apparatus body which intersect with each other, said first and second rotatable operation elements positioned within an area of a single circle such that when said first and second rotatable operation elements are operated together, a user is provided with an operation feeling of rotating a single disk; and a control section provided in said electric circuit section for receiving an input signal supplied thereto from said operation section, said control section changing over an operation based on the input signal from said operation section between a first state wherein said lid member is pivotally rotated in one direction around the second pivotal axis and a second state wherein said lid member is pivotally rotated in the other direction around the second pivotal axis, wherein said first and second rotatable operation elements disposed on said two side faces of said apparatus body enables said control section to control the movement of the cursor displayed on said display section even when said lid member covers said upper face of said apparatus body.

17. An electronic apparatus according to claim 16, wherein, when the input signal is supplied from said operation section to said control section while said lid member is pivotally rotated to the second position, said control section controls so that an operation same as that in one of the first state and the second state is performed.

18. An electronic apparatus according to claim 16, further comprising a detection section for detecting in which one of directions around the axis parallel to the plane of said lid member at the second position said lid member is pivotally rotated, wherein an output of said detection section is supplied to said control section.

19. An electronic apparatus according to claim 16, wherein said operation section comprises a substantially cross-shaped operation button; and the cursor displayed on said display section being moved in one of upward, downward, leftward and rightward directions in a display screen of said display section in response to an operation of said operation button.

20. An electronic apparatus according to claim 19, further comprising a plurality of switches provided at positions of said apparatus body at which said switches are operated by operating end portions of said operation button.

21. An electronic apparatus according to claim 16, wherein said first and second operation elements are provided in such a manner as to project outwardly from said respective side faces of said apparatus body.

22. An electronic apparatus according to claim 21, wherein said first and second operation elements are provided for pivotal motion around axes perpendicular to the principal surface of said apparatus body.

23. An electronic apparatus according to claim 1, wherein said electronic apparatus includes a disk player.

24. An electronic apparatus according to claim 1, wherein said electronic apparatus includes a portable DVD player.

25. An electronic apparatus according to claim 1, wherein said electronic apparatus includes a video camera.

26. An electronic apparatus according to claim 1, wherein said electronic apparatus includes a portable computer.

* * * * *